United States Patent [19]

Schäfer et al.

[11] Patent Number: 5,175,963
[45] Date of Patent: Jan. 5, 1993

[54] CLAMPING DEVICE FOR AXIALLY CLAMPING OF A TOOL, ESPECIALLY A DISC

[75] Inventors: Dieter Schäfer, Leonberg; Karl-Ernst Köber, Grötzingen; Volker Lasch, Stuttgart; Karl Treyz, Leinfelden-Echterdingen; Manfred Kirn, Stuttgart; Erich Borst, Leinfelden-Echterdingen; Günter Schaal, Stuttgart; Kurt Metzger, Leinfelden-Echterdingen, all of Fed. Rep. of Germany

[73] Assignee: Robert Bosch GmbH, Stuttgart, Fed. Rep. of Germany

[21] Appl. No.: 623,914

[22] PCT Filed: Apr. 6, 1989

[86] PCT No.: PCT/DE89/00210

§ 371 Date: Dec. 13, 1990

§ 102(e) Date: Dec. 13, 1990

[87] PCT Pub. No.: WO90/00463

PCT Pub. Date: Jan. 25, 1990

[30] Foreign Application Priority Data

Jul. 15, 1988 [DE] Fed. Rep. of Germany ....... 3824040

[51] Int. Cl.$^5$ ............................................. B24B 45/00
[52] U.S. Cl. ....................................................... 51/168
[58] Field of Search ................... 51/168, 209 R, 376, 51/377, 378, 170 R, 170 PT, 170 T; 403/24, 259; 83/666, 698; 279/75

[56] References Cited

U.S. PATENT DOCUMENTS 4,525,097 6/1985 Ziegelmeyer .
5,042,207 8/1991 Kirn ............................... 51/168

FOREIGN PATENT DOCUMENTS 0231500 8/1987 European Pat. Off. .
3012836 9/1985 Fed. Rep. of Germany .
3705638 9/1988 Fed. Rep. of Germany .
2101513 3/1972 France .
0005366 7/1988 Int'l Pat. Institute .
0825877 12/1959 United Kingdom .

Primary Examiner—Roscoe V. Parker
Attorney, Agent, or Firm—Michael J. Striker

[57] ABSTRACT

A device for axially clamping a disc-shaped tool on a flange of a driven spindle with a threaded end, includes a clamping nut, a clamping disc supported on the clamping nut for biasing the disc against the flange and connected with the clamping nut for joint rotation therewith and axial displacement relative thereto, and supporting bodies arranged between the clamping nut and the clamping disc. An actuating member is located between the clamping nut and the clamping disc, and rolling bodies are displaceable along guide paths defined by guide tracks of the supporting bodies and guide track means of the actuating member for radially loading the supporting bodies. An insert member is supported between the clamping nut and the clamping disc and includes a plurality of stops projecting into the guide paths. The actuating member presses the rolling bodies against the stops upon rotation in a first direction corresponding to a clamping direction, and displace the rolling bodies into associated radial recesses thereon upon rotation in a second direction opposite to the first direction to relieve the supporting bodies from radial loads and to relieve the clamping disc from an axial clamping pressure.

45 Claims, 7 Drawing Sheets

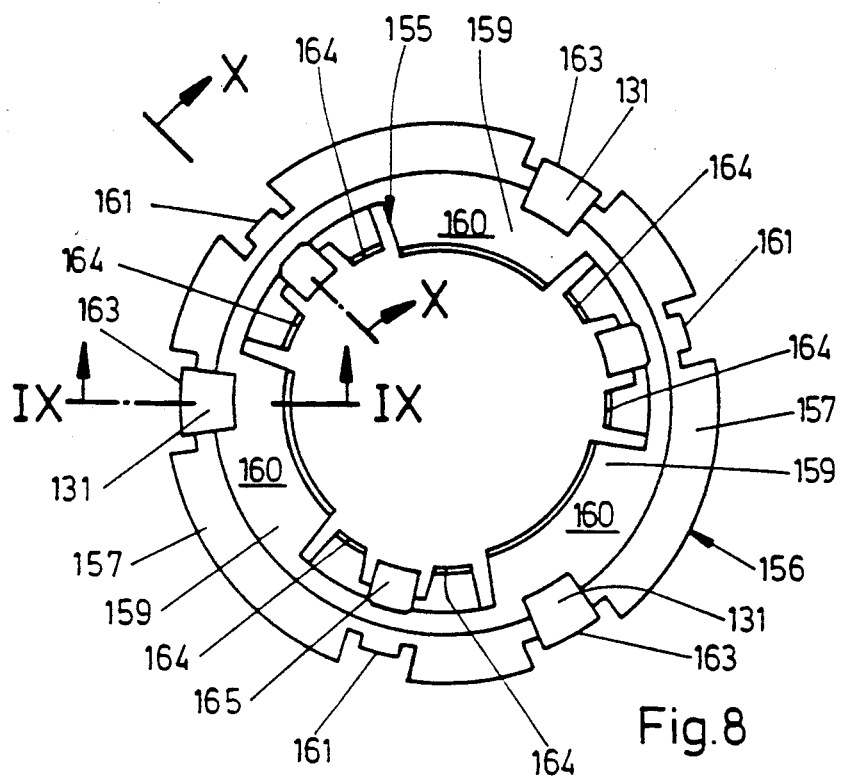
Fig. 8
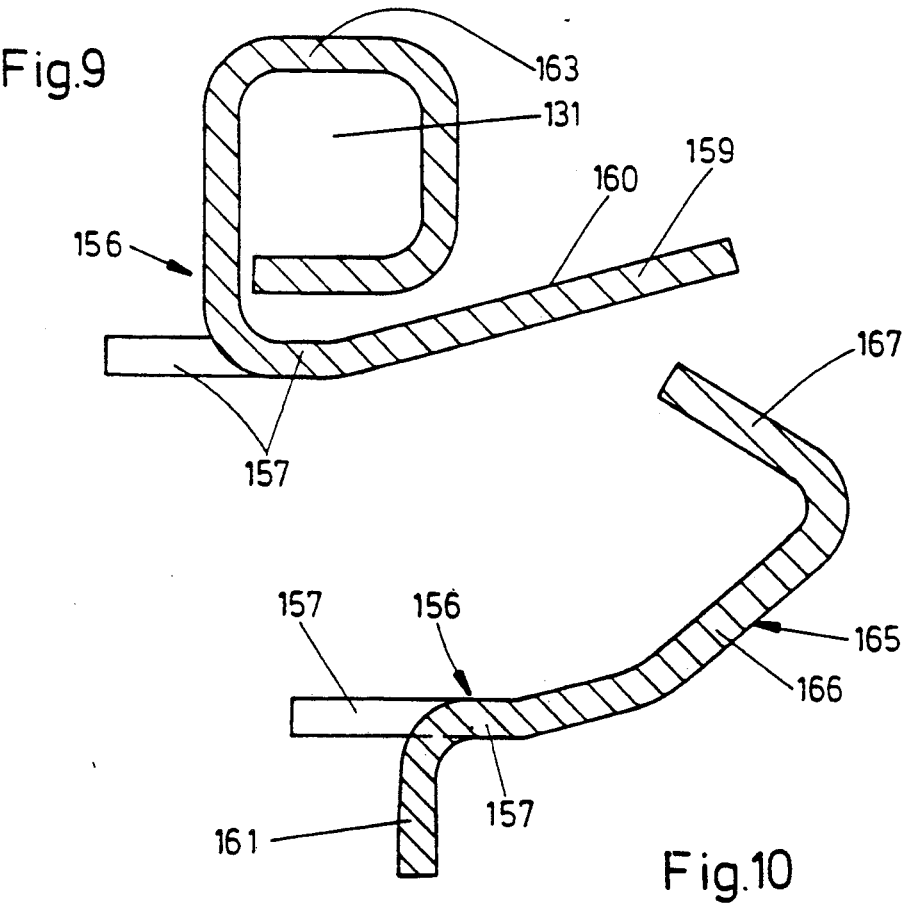
Fig. 9
Fig. 10

5,175,963

CLAMPING DEVICE FOR AXIALLY CLAMPING OF A TOOL, ESPECIALLY A DISC

BACKGROUND OF THE INVENTION

The invention relates to a clamping device for the axial clamping of a tool, especially a disc, on a flange of a driven spindle, and comprising a clamping nut that is screwed on a threaded end shank of the spindle, and a clamping disc arranged between the tool and the clamping nut for biasing the tool against the flange. Clamping devices of this type have proved successful. The advantages afforded thereby are adduced in P 37 05 638. In these devices, the stops against which the rolling bodies, on one hand, and the springs, on the other hand, abut still require relatively complicated and, in terms of their production, expensive parts when provided either on the clamping disc or the clamping nut. These would have to be produced, for example, as sintered parts or extruded parts. However, where sintered parts are concerned, this presents problems for reasons of strength and, as with regards to extruded parts, there is great expense because of the re-working required. Where the supporting bodies rest on the clamping nut and clamping disc and are supported axially, hardened surfaces are desirable in order to reduce the wear and obtain a long lifetime. The hardening of the clamping disc or clamping nut in this region would likewise involve a high outlay and be expensive.

SUMMARY OF THE INVENTION

The object of the invention is a clamping device of which the individual parts, especially the clamping nut and/or clamping disc, can be designed more simply and therefore produced more simply and more cost-effectively.

The object of the invention is achieved by providing a device in which supporting bodies are arranged between the clamping nut and the clamping disc with each having a guide track; and there is provided an actuating member located between the clamping nut and the clamping disc and defining guide track means and radial recesses opening into the guide track means, rolling bodies are displaceable along guide paths defined by guide tracks of the supporting bodies and the guide track means for radially loading the supporting bodies, and an insert member is supported between the clamping nut and the clamping disc and includes a plurality of stops projecting into the guide paths. The actuating member presses the rolling bodies against the stops upon rotation in a first direction corresponding to a clamping direction, and displace the rolling bodies into associated radial recesses upon rotation in a second direction opposite to the first direction. Thereby the supporting bodies are relieved from radial loads and the clamping disc is relieved from an axial clamping pressure.

The clamping device according to the invention has the following advantages. The separate insert part, for example designed as a sheet-metal formed part at the same time, for example, as a sheet-metal stamped part, is simple and cost-effective. The individual elements required can be formed in this insert part quickly and cost-effectively. The insert part is so designed that it rests and is supported axially either on the clamping disc or on the clamping nut. This affords the precondition that segments of this insert part form, on their top side, the supporting surface, on which the supporting bodies rest and are supported by their confronting oblique supporting surface. At least these segments of the insert part which carry the supporting surfaces can be hardened, so that these supporting surfaces have a long lifetime. On one hand, the respective stop, on which a rolling body on the one hand and the confronting end of the spring on the other hand is supported, is worked out of the insert part, for example sheet-metal formed part. The retention parts ensuring a retention in the circumferential direction of the insert part in relation to the clamping disc or clamping nut can also be formed from the insert part, for example in the form of cut-out and bent noses. The positioning members which position the individual supporting bodies in the circumferential direction and keep them at a distance from one another can also be formed from the insert part by appropriate stop parts cut in and bent upwards, so that no additional separate elements involving a high outlay are needed. At the same time, assembly safeguards which secure the springs during assembly can also be cut out from the insert part and bent. An insert part of this type, especially a sheet-metal formed part, is simple and cost-effective and makes it possible to produce the clamping nut and clamping disc especially simply and cheaply, in particular each as a simple lathe-turned part. The clamping device thus becomes considerably more cost-effective.

The sheet-metal formed part may be designed as a spring element exerting an axial spring force which is effective between the clamping nut and clamping disc and biases these two parts apart. This spring element includes bent spring tongues resting, preferably with a preload, against at least one of the clamping disc and clamping nut. The spring tongues are generally formed by upward projecting stop parts and/or by upwardly projecting toe-shaped sheet-metal cutouts, especially the tongue portion and the adjacent end portion. The bent parts are bent to such an extent that they resiliently bias at least one of the clamping disc and clamping nut.

The present invention both as to its construction so to its mode of operation, together with additional objects and advantages thereof, will be best understood from the following detailed description of preferred embodiments when read with reference to the accompanying drawings.

BRIEF DESCRIPTION OF THE DRAWINGS

FIGS. 9 shows a cross-sectional view along the line IX—IX in FIG. 8.

FIG. 10 shows a cross-sectional view along the line X—X in FIG. 8.

DESCRIPTION OF THE PREFERRED EMBODIMENTS

Figure 1:
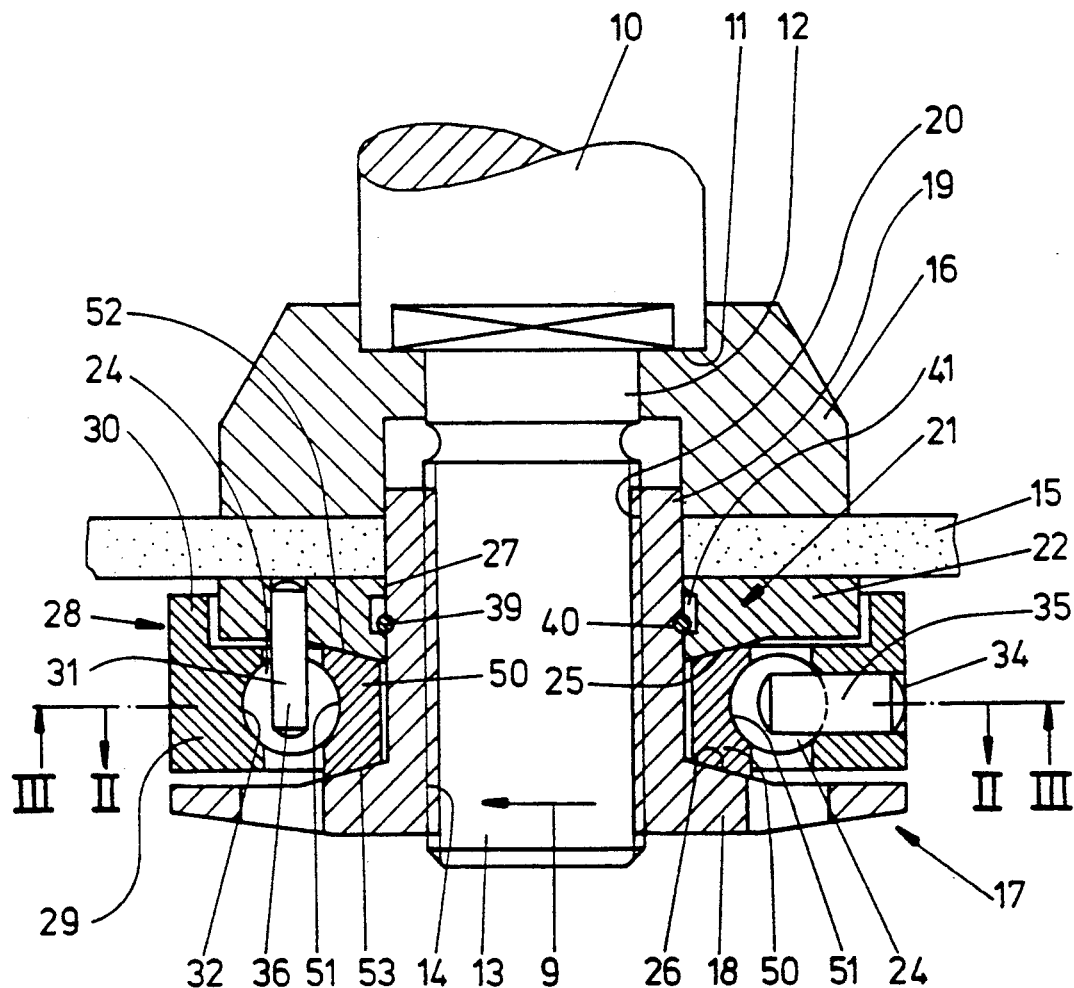
FIG. 1 shows an axial cross-sectional view of a clamping device according to the invention with a clamped grinding disc along the line I—I of FIG. 2.

FIGS. 1-5 illustrate the lower part of a portable hand-operated machine tool designed, for example, as an angle grinder and having a spindle 10 which is motor-driven via a gear (not shown) and which at the end merges via an annular shoulder 11 into a cylindrical shank 12 of smaller diameter and then into a threaded end shank 13 with an external thread 14. The spindle 10 serves for driving a tool 15 which consists, for example, of the grinding disc indicated or of another tool disc, a rubber plate or the like. The tool 15 is mounted and clamped between a flange 16 and a clamping member which is part of a clamping nut 17 and which is explained in more detail below. The flange 16 is supported axially on the annular shoulder 11 and is centred radially on the cylindrical shank 12. By means of shaped surfaces fitting together, for example two mutually parallel flattened portions, on the spindle 10 and on the flange 16, the latter is positively connected integrally to the spindle 10, for joint rotation therewith in the direction of rotation according to the arrow 9 when the motor is switched on. This direction of rotation according to the arrow 9 corresponds to the working direction of the tool 15 in which the latter is driven. This corresponds to the clockwise direction, as seen in the top view according to FIG. 2. The clamping nut 17 has a flange 18 and a hub 19 extending from this flange in the form of a cylindrical sleeve the hub 19 has a continuous internal thread 20, by which the clamping nut 17 is screwed onto the external thread 14 of the threaded shank 13. The tool 15 is centred, during fastening, on the outer circumferential surface of the hub 19.

Arranged in the axial region between the tool 15 and the clamping nut 17 is a clamping disc 21 which has a clamping plate 22 pressing against the tool 15. The clamping disc 21 can be subjected to an axially directed pressure force by the clamping nut 17 and is capable of pressing axially against the tool 15 and pressing the latter firmly against the axial end face of the flange 16.

The clamping disc 21 is coupled to the clamping nut 17 for joint rotation therewith and an axial displacement relative thereto. Supporting bodies 50 are arranged axially between the clamping disc 21 and the flange 18 of the clamping nut 17. A supporting surface in the form of an annular surface 26 is assigned to the supporting bodies 50 on the confronting side of the flange 18 of the clamping nut 17. The opposite axial side of the supporting bodies 50 is likewise assigned a supporting surface which consists of an annular surface 25 on the confronting side of the clamping plate 22 of the clamping disc 21.

Arranged between the clamping disc 21 and the clamping nut 17 is an actuating member 28 in the form of a ring 29 which with an annular collar 30 at the top engages axially over the clamping plate 22 with a play between them. The annular collar 30 terminates axially at a distance from and, according to FIG. 1, underneath the end face of the clamping plate 22 resting against the tool 15. The ring 29 sits axially with a play between the clamping disc 21 and the clamping nut 17 and is held rotatably relative to both of these. On the inside, the ring 29 contains an annular surface 32 of approximately gutter-shaped cross-section which, in another embodiment (not shown), can also be cylindrical. At the same axial height, the supporting bodies 50 have a corresponding annular surface 51 in the form of a groove-shaped recess on their radially outer circumferential surface. The supporting bodies 50 are stressed radially by rolling bodies 24 which are guided and roll on the annular surfaces 32 and 51 and which here consist of balls. In the embodiment illustrated, there are three balls 24 which are arranged at approximately equal circumferential angular distances from one another and are guided on the annular surfaces 32 and 51 concentric relative to the mid-axis and which at the same time are in contact with the supporting bodies, 50 on one hand, and with the actuating member 28, on the other hand. The actuating member 28 acts on the balls 24 which are pressed by it in the opposite direction to the arrow 9 against stops 31 of the clamping disc 21 in the direction corresponding to the clamping direction. This clamping state is shown in FIGS. 1 to 5.

Figure 2:
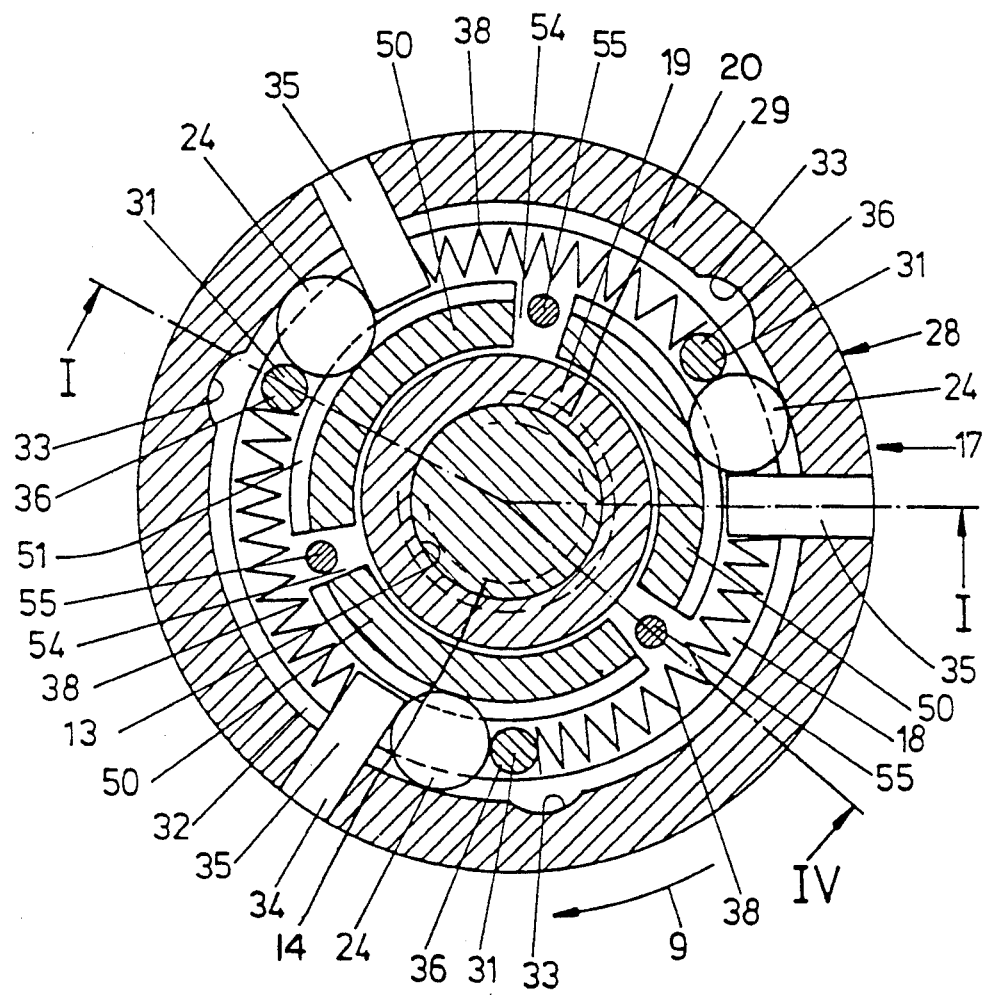
FIG. 2 shows a cross-sectional view along the line II—II in FIG. 1.
Figure 3:
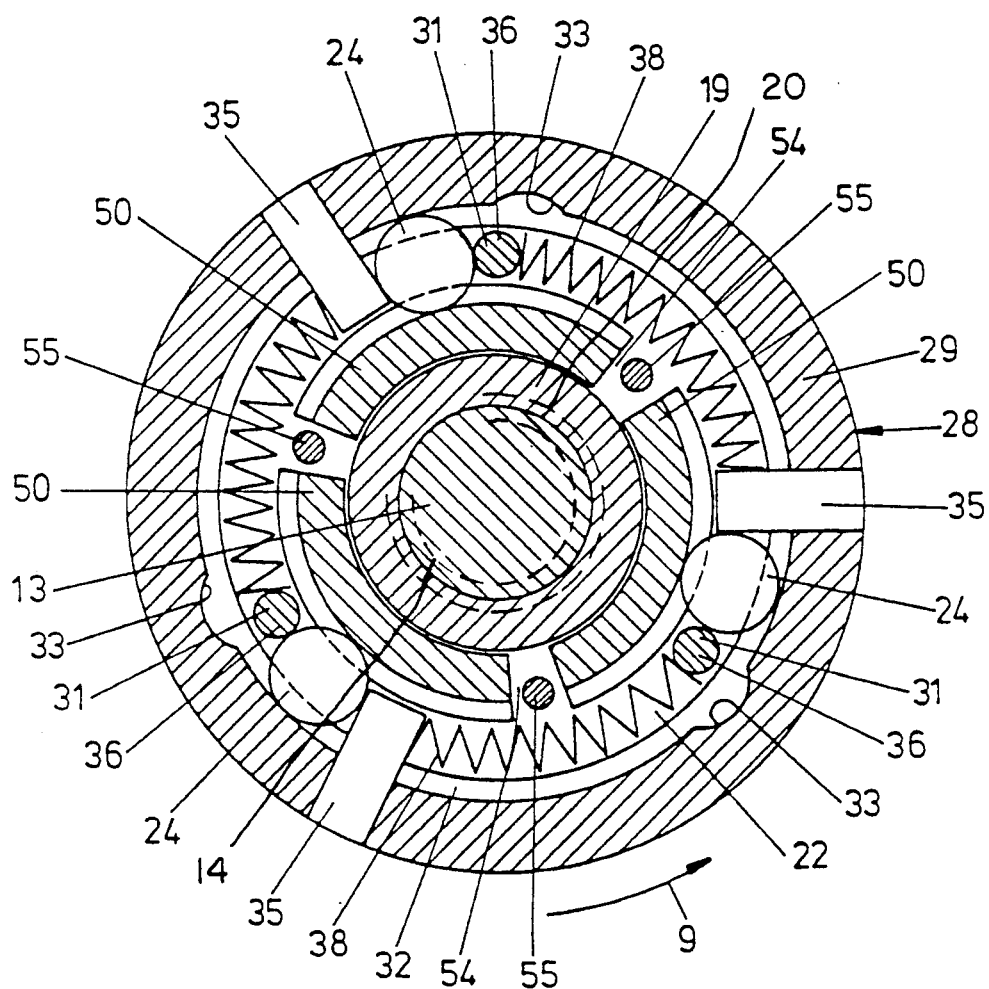
FIG. 3 shows a cross-sectional view along the line III—III in FIG. 1.
Figure 4:
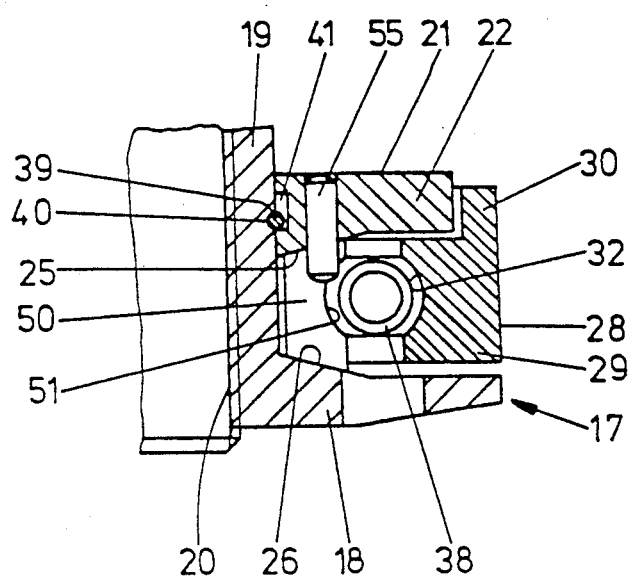
FIG. 4 shows a cross-sectional view along the line IV—IV in FIG. 2.

As is evident from FIGS. 2 and 3, the region of the annular surface 32 of the actuating member 28 contains for each ball 24 a clearance 33 which is assigned to the latter and which respectively consists of a recess in the annular surface 32 and is designed especially as a ball pocket sunk radially outwards and open towards the center. Each clearance 33 is created such that, when the balls 24 roll and reach the respective associated clearance 33, the balls 24 can travel radially outwards, thereby ensuring a radial relief of the supporting bodies 50, so that the supporting bodies 50 can shift at least slightly radially from the inside outwards For this, it is sufficient if at least one of the two annular surfaces 25 and 26, between which the supporting bodies 15 are arranged axially, is made conical and at the same time with a cone tip so aligned that, during this radial relief and radial shift on this oblique annular surface 25 and/or 26, the supporting bodies 50 allow an axial movement of the clamping disc 21 in the direction of the clamping nut 17, at least with a slight reduction of the axial distance, so that the clamping disc 21 is relieved of the clamping pressure.

In the exemplary embodiment illustrated, both the supporting annular surface 25 of the clamping disc 21 and the supporting annular surface 26 of the clamping nut 17 are frustoconical and designed in the way described, so that the two annular surfaces 25, 26 together form a keyway, Both on the axial side confronting the annular surface 25 and on the opposite axial side, the supporting bodies 50 have bearing surfaces 52 and 53 corresponding to the form of the respective annular surfaces 25 and 26. In the embodiment illustrated, each supporting body 50 has approximately a wedge-shaped cross-section, the wedge angle corresponding at least substantially to that of the keyway formed by the annular surfaces 25, 26. As is evident from FIGS. 2 and 3, the individual supporting bodies 50 are formed respectively as ring segments. In the embodiment illustrated, there are three such supporting bodies 50 of ring segment form provided, which are arranged at approximately equal circumferential angular distances from one another. At the same time, between the supporting bodies 50 adjacent to one another are left respective gaps 54, into which approximately axis-parallel positioning members 55 in the form of pins project. These pins 55 are located outside the rolling region of the balls 24, so that they do not impede their rolling movement between the annular surfaces 32 and 51. In the embodiment shown, the pins 55 are fastened to the clamping disc 21 and project beyond the supporting annular surface 25 of the latter. In another exemplary embodiment (not shown), the pins 55 are instead attached to the clamping nut 17. The pins 55 put the supporting bodies 50 in position in the circumferential direction and guarantee that the supporting bodies 50 will not shift in the circumferential direction.

The actuating member 28 is equipped, for each ball 24, with a fixed driver 34 in the form of a radial pin 35 which is attached fixedly to the ring 29 and which projects radially from the outside inwards into the path of the respective preceding ball 24, at least to such an extent that, for example, an approximately tangential bearing against the respective preceding ball 24 thereby takes place.

The stops 31 of the clamping disc 21 are formed by longitudinal pins 36 which extend substantially axially and pass in an approximately axis-parallel manner through the guide groove for the balls 24, which is formed together by the annular surfaces 32 and 51, at the same time in such a way that there is still a sufficient interspace between the inner face of the ring 29 and the longitudinal pins 36 to ensure that these do not brush against the actuating member 28 during the relative rotation between the actuating member 28, on one hand, and the clamping nut 17 with clamping disc 21 on the other hand. The longitudinal pins 36 are each located on the other side of the respective associated ball 24 which is located opposite the radial pin 35 for each ball 24. In the clamping position shown in FIGS. 1-5, with the tool 15 clamped and the motor switched on, the clamping disc 21 is also rotatable in the working direction according to the arrow 9 via the clamping force and the friction with the tool 15. Since the clamping disc 21 is coupled to the clamping nut 17 so as to be relatively displaceable axially, but is rotatable therewith in the circumferential direction, the clamping nut 17 is also likewise rotatable. The longitudinal pins 36 at the same time act in the direction of the arrow 9, against the respective preceding balls 24 which thereby press against the respective preceding radial pins 35 of the actuating member 28. The actuating member 28 is spring-loaded in the opposite direction to the direction of rotation according to the arrow 9 which opposite direction corresponds to the releasing direction. This is obtained by respective cylindrical helical springs 38 which are located within the guide groove of the balls 24, formed by the annular surfaces 32 and 51, and which extend in the circumferential direction. Each helical spring 38 is, at the same time, arranged in the circumferential region between a longitudinal pin 36 and a radial pin 35 and at the ends is supported thereby. The helical springs 38 load the actuating member 28 resiliently relative to the clamping nut 17 and the clamping disc 21 in the opposite direction to the direction of arrow 9, in such a way that the respective radial pin 35 presses the respective preceding ball 24 against the preceding longitudinal pin 36 in the direction opposite to the direction of the arrow 9. The actuating member 28 is consequently held via the helical springs 38 in the clamping position shown in FIGS. 1-5, relative to the clamping nut 17 with the clamping disc 21.

The clamping disc 21 is secured axially on the clamping nut 17 in such a way that an at least slight axial movement between the two is possible. The clamping disc 21 has a continuous inner face 27 which is located in the region of the clamping plate 22 and can be basically cylindrical and through which passes the hub 19 of the clamping nut 17, on which the clamping plate 22 is centered and is held and guided axially movably at least within predetermined limits. For securing purposes, there can be a spring ring 39, indicated merely diagrammatically in FIG. 1, which is received essentially with an exact fit in a slot 40 on the outer circumferential surface of the hub 19 of the clamping nut 17, specifically in such a way that the spring ring 39 enters the slot 40 approximately with half its cross-section, while the other half of its cross-section projects radially. The clamping disc 21 contains, on the inner face 27, a slot 41 which is assigned to the spring ring 39, but which has a larger axial width than the spring ring 39 and the slot 40. The radially measured depth of the slot 41 corresponds approximately to the other half of the cross-section of the spring ring 39. The flanks of the slot 40 and/or 41 can be bevelled, with the result that it is possible for the clamping disc 21 and a clamping nut 17 to be easily pushed together and later released in the axial direction. In the above-described design with a cylindrical inner face 27 and cylindrical outer face of the hub 19, the torque-transmitting coupling between the clamping disc 21 and the clamping nut 17 takes place, for example, via the longitudinal pins 36 which are extended axially as far as the flange 18 of the clamping nut 17 and which engage with axial sliding play into bores located there.

Figure 5:
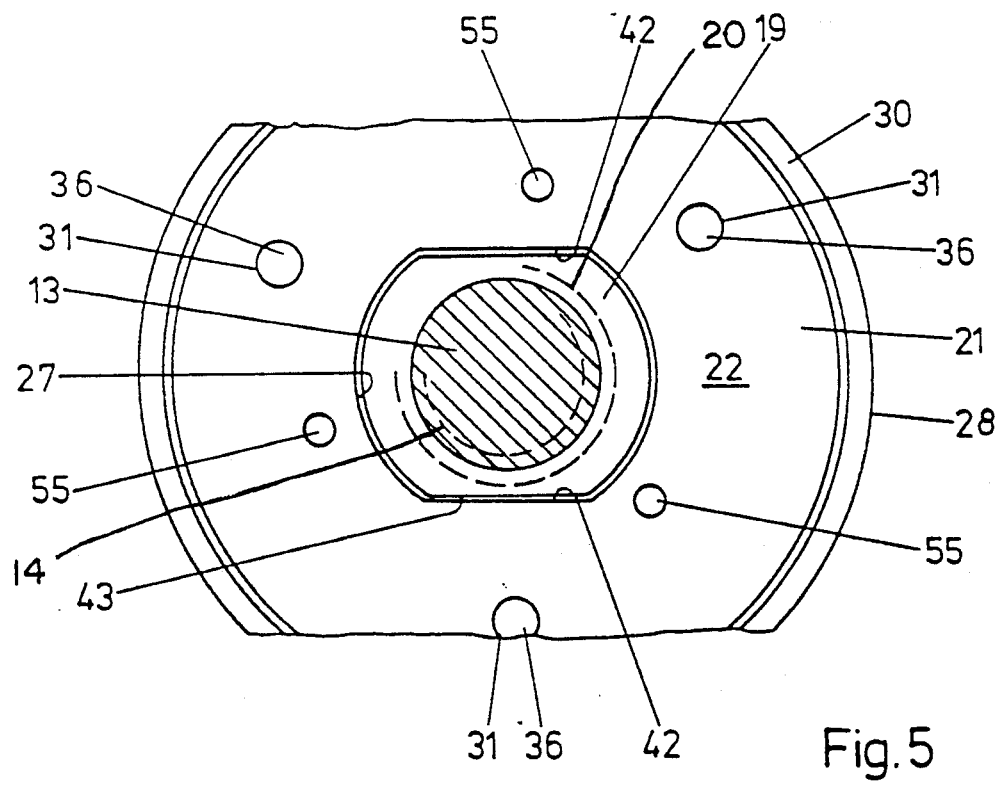
FIG. 5 shows a partially cross-sectional top view with parts of the clamping device.

In the embodiment illustrated, the non-rotatable coupling is obtained instead by outer shaped surfaces As shown in FIG. 5, the inner face 27 of the clamping plate 22 of the clamping disc 21 is equipped differently from the cylindrical form with two flat surfaces 42 located diametrically opposite one another. In a corresponding relationship, the hub 19 of the clamping nut 17 has corresponding outer flat surfaces 43 in the same axial region, thus resulting in a positive coupling which is made in the circumferential direction via the flat surfaces 42 and 43, but which allows axial relative displaceability at least within limits Instead of a spring ring 39, in this case there is provided a, for example, approximately hairpin-shaped spring clip, the two legs of which can be seen in the sectional representation of FIGS. 1 and 4 to which what was described above applies.

In the interspaces between the ring 29 and the clamping disc 21 on one axial side of this and the flange 18 of the clamping nut 17 on its other axial side, it is possible to arrange sealing elements, not shown further, for example foam-rubber rings, which guarantee sealing against the penetration of dirt, for example dust or the like. The sealing elements are inserted during assembly.

FIGS. 1-4 show the clamping device described in its clamping position, in which the tool 15 is clamped axially against the flange 16 via the clamping disc 21 supported axially on the clamping nut 17 via the supporting bodies 50.

When the tool 15 is to be removed and changed, the flange 16 and/or the tool 15 is blocked against rotation by suitable means, this possibly being carried out, for example, by an appropriate blocking of the spindle 10, for example by means of a spindle detent device integrated in the hand-operated machine tool. Under some circumstances, the friction in the gear up to the motor is also possibly sufficient to prevent the spindle 10 from rotating in the direction of the arrow 9, at least within limits. For the release, the actuating member 28 is then rotated by hand in the working direction according to the arrow 9, the radial pins 35 lifting off from the balls 24 and, the helical springs 38 experiencing compression, being moved circumferentially in the direction of the longitudinal pins 36 of the clamping disc 21, not rotating relative to these, together with the clamping nut 17. During this movement, the balls 24 roll on the tracks formed by the annular surfaces 32 and 51, the balls 24 likewise travelling in the circumferential direction according to the arrow 9. As soon as the balls 24 have reached the clearances 33 in the annular surface 32 of the actuating member 28 during this movement, the balls 24 enter these clearances 33 radially. The supporting bodies 50 are thereby relieved, at least within limits, of the supporting force acting on them radially from the outside inwards The supporting bodies 50 can therefore shift radially outwards with their oblique bearing surfaces 52, 53 on the correspondingly oblique annular surfaces 25 and 26. Because of the oblique surfaces, the clamping disc 21 can move away axially under the clamping pressure, that is to say, as seen in FIG. 1, can shift axially at least slightly in the direction of the clamping nut 17 and the ring 29, at least until an appropriate axial relief of tension is obtained. The complete unit consisting of clamping nut 17 with clamping disc 21 and of the actuating member 28 can thereupon be completely unscrewed easily by hand. The relative pivoting movement of the actuating member 28 for the axial relief of the clamping disc 21 is limited because, when the helical springs 38 are compressed completely, the radial pins 35 butt against the longitudinal pins 36. As soon as the axial relief of tension has taken place and the complete unit can easily be unscrewed completely by hand, the balls 24 automatically return by the relaxing helical springs 38. As a result of the spring pressure on the radial pins 35, the actuating member 28 is rotated relative to the clamping nut 17 with clamping disc 21 back again into the initial position shown in FIGS. 2 and 3, and as a result of the rolling movement of the balls 24 these are once again moved out of the clearances 33 and moved back into the position shown During the movement of the balls 24 out of the clearances 33, in such a way that the balls are once more supported on the annular surface 32 of the actuating member 28, a force directed radially from the outside inwards, is exerted on the supporting bodies 50 via the balls 24 and once again forces these back into the initial position shown in FIGS. 1-4, in which the clamping disc 21 resumes the initial position according to FIG. 1. In this position, the complete unit consisting of the clamping nut 17 with clamping disc 21 and of the actuating member 28 is ready for the clamping of a new inserted tool. For this, it is sufficient to tighten this complete unit slightly in the direction opposite to that shown by arrow 9 when it is being screwed onto the threaded shank 13 and thus secure the new tool 15 easily, since, when the motor is next switched on, the tool 15 tightens itself automatically during operation.

The same principle of the clamping device according to the invention can also be implemented on the rear flange 16 located on the same side as the spindle, this flange then being exchanged for the complete unit consisting of the clamping nut with clamping disc and of the actuating member, and the clamping disc then being pressed to the rear against the tool. Furthermore, this principle can also be adopted at another location of a hand-operated machine tool, for example in the form of a split grinding spindle in the gear.

The clamping device described is simple, cost-effective and can be handled quickly, reliably and easily. It makes it possible to change the tool 15 quickly and reliably, without the need for additional special tools. A further advantage is that even existing hand-operated machine tools, especially grinding machines, can subsequently be equipped with this clamping device without any other conversion work. For this, it is merely necessary to replace its conventional clamping nut with the complete part consisting of the clamping nut 17 with clamping disc 21 and the actuating member 28. Moreover, the clamping nut 17 can be designed so that if necessary, as before, it also allows the engagement of a special tool, for example in the form of a pin-type face spanner, so that by means of this the clamping nut 17 and therefore the entire complete part can also be released in the conventional way by means of such an auxiliary tool in especially tenacious circumstances, for example in the rusted-in state. The clamping device is not restricted to a grinding disc as a tool 15. On the contrary, other tools, for example clamping discs, brushes, rubber plates, saw blades of a circular saw or the like, can also be clamped in the same way without a tool.

A modified second embodiment according to the additional invention is described below with reference to FIGS. 6-10.

In this second embodiment, reference symbols greater by 100 are used for the parts corresponding to the first embodiment, thereby referring to the description of the first embodiment to avoid repetition, the foregoing disclosure of the latter also being deemed essential to the invention and disclosed in respect of the second embodiment.

A particular feature of the second embodiment in comparison with the first exemplary embodiment is that the respective approximately diametrically directed driver 134 of the actuating member 128 is designed as a nose formed integrally with the actuating member 128 and which projects radially inwards from the ring 129 into the track of the rolling bodies 124. The actuating member 128 is designed as an integral formed part, for example a sintered part.

In the second embodiment, the rolling bodies 124 are designed not as balls, but as cylindrical rollers, the cylinder axis being aligned approximately parallel to the longitudinal mid-axis of the clamping nut 17.

The actuating member 128 has, for the cylindrical rolling bodies 124, an associated non-recessed cylindrical track 132 in a circumferential region between two respective successive drivers 134. The three supporting bodies 150 arranged at approximately equal circumferential angular distances from one another are equipped with a likewise cylindrical track 151 on their outer circumferential surface, so that the cylindrical rolling bodies 124 can roll on these cylindrical tracks 132, 151.

In contrast to the first embodiment, the actuating member 128 is equipped not only with a cylindrical upper annular collar 130, but at an axial distance from this with a further lower cylindrical annular collar 130a, these likewise being in one piece with the actuating member 128. The upper annular collar 130 at least partially engages over and surrounds the clamping disc 121 on the outside and the lower annular collar 130a at least partially engages over and surrounds the clamping nut 117 on the outside. Arranged between the annular collars 130, 130a and the clamping disc 121 and clamping nut 117 is a respective sealing element 101 and 101a which consists, for example, of an elastic sealing ring. This is, for example, in each case a rubber ring. The sealing elements 101, 101a serve for sealing off the inner space which is bounded by the clamping nut 117, the clamping disc 121 and the actuating member 128. Moreover, they hold the actuating member 128 in position, at least axially. The clamping nut 117 and the clamping disc 121 possess, on the outer edge and on the mutually confronting inner faces, offset shoulders which there form step-shaped annular receptacles for the sealing elements 101, 101a.

The flange 116 is equipped with an axially projecting annular rim 102, on which the tool 115 in the form of the disc is centered radially.

A further likewise essential particular feature is that a special insert part 156, designed here as a sheet-metal formed part, for example a sheet-metal stamped part, is introduced between the clamping disc 121 and the clamping nut 117. The insert part 156 consists of an at least partially flat ring which with a flat and plane annular portion 157 rests and is supported axially on an associated correspondingly plane radial surface 158 of the clamping nut 117.

Figure 6:
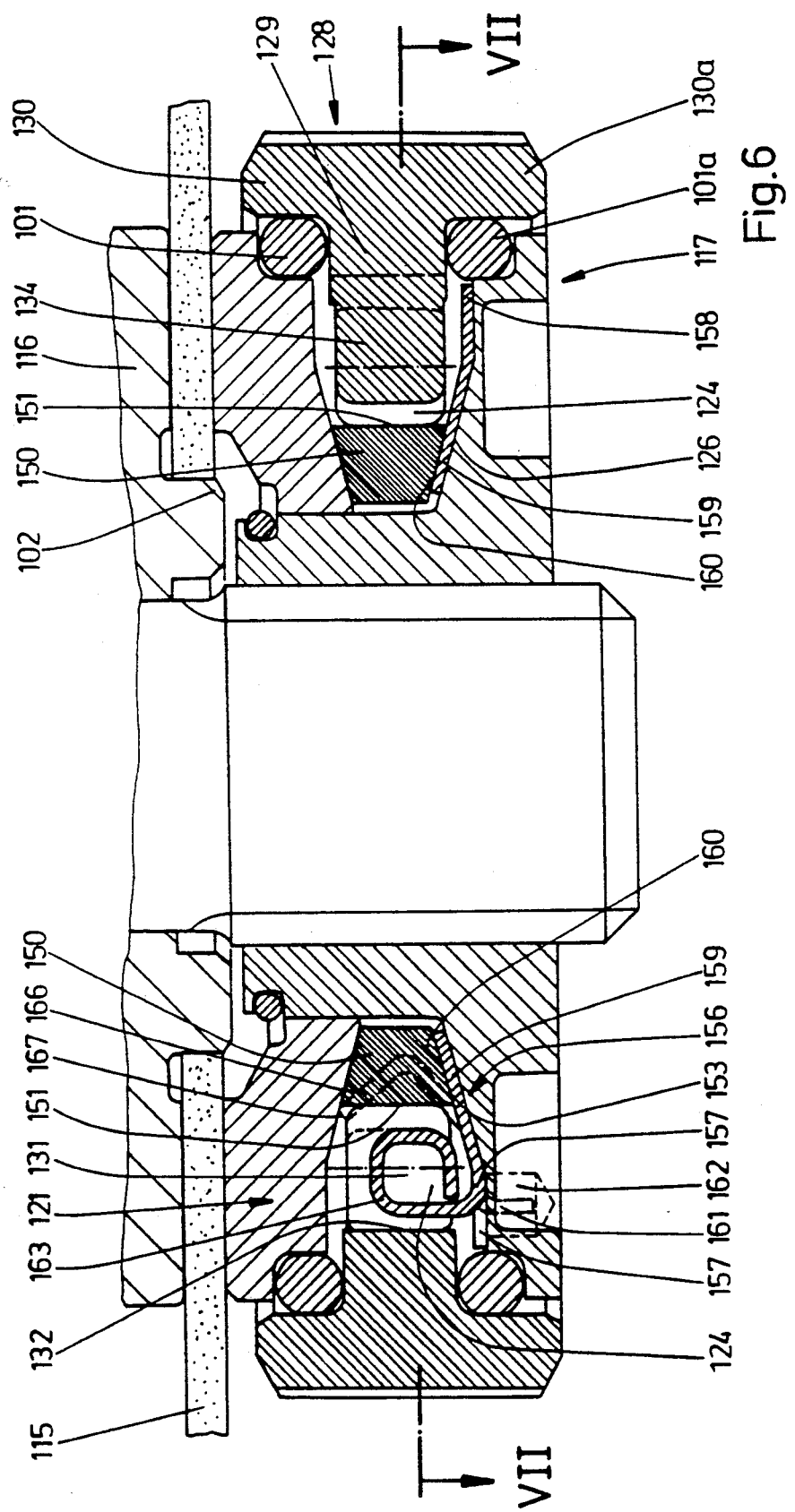
FIG. 6 shows an axial cross-sectional view corresponding approximately to that of FIG. 1, of a clamping device according to a second embodiment along the line VI—VI in FIG. 7.
Figure 7:
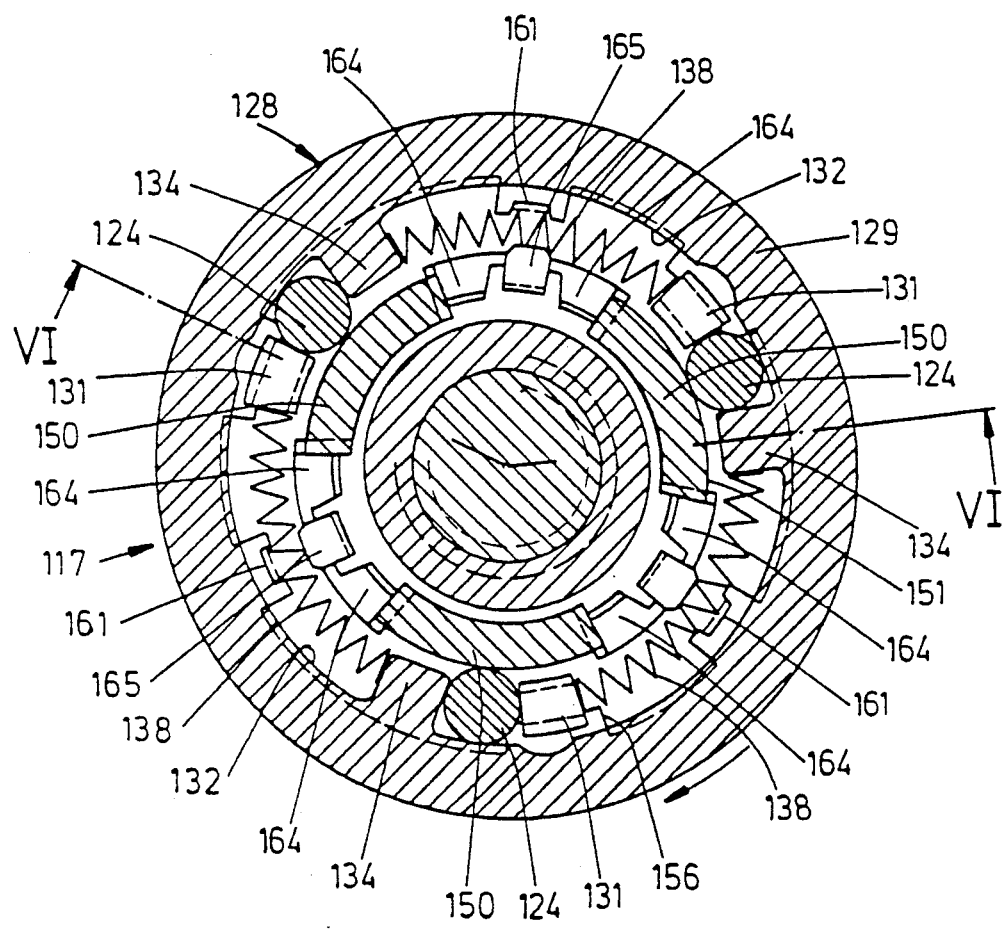
FIG. 7 shows a cross-sectional view along the line VII—VII of FIG. 6, FIG. 8. shows a top view of the insert part of the clamping device of FIGS. 6 and 7.

In another embodiment (not shown), the insert part 156 is instead supported axially by the flat annular portion 157 on a plane radial surface on the side of the clamping disc 121 at the bottom in FIG. 6.

At least in the circumferential region over which the supporting bodies 150 extend, the insert part 156 has segments 159, especially ring segments, which each carry on their top side a supporting surface 160 for the supporting bodies 150 resting on them. The angular circumferential extent of the individual segments 159, especially ring segments, corresponds at least approximately to that of each supporting body 150. The supporting surface 160 is assigned to the bearing surface 153 of the individual supporting bodies 150 which is at the bottom in FIG. 6. It extends correspondingly frustoconically. The supporting surface 160 extends, for example, at an angle of inclination of approximately 15°. The angular circumferential extent of each segment 159, especially ring segment, is, for example, a circumferential angle of approximately 50° to 60°. At the same time, the individual segments 159 are preferably arranged at equal circumferential angular distances from one another. The insert part 156 in the form of a sheet-metal formed part can be hardened completely. It is sufficient, however, if at least the supporting surfaces 160 and the segments 159, especially ring segments, are hardened.

The segments 159, especially ring segments, are designed as sheet-metal portions bent upwards out of the plane of the flat plane annular portion 157 of the sheet-metal formed part. These sheet-metal portions are bent upwards at least approximately at the same angle at which extends the annular surface 126 of the clamping nut 117 forming a supporting surface for these oblique segments 159, on which the respective sheet-metal portions rest and are axially supported.

Furthermore, the insert part 156 has projecting retention parts 161, for example noses, which, in the embodiment shown, are directed towards the clamping nut 117. The retention parts 161 engage into associated receptacles 162 in the form of blind-hole bores in the clamping nut 117, so that the insert part 156 is thereby coupled positively to the clamping nut 117 in the circumferential direction. The retention parts 161 are preferably arranged at equal circumferential angular distances from one another and designed as tabs which are bent downwards approximately at right angles in FIG. 6 out of the plane of the flat plane annular portion 157 of the sheet-metal formed part and can engage there into the upwardly open associated receptacle 162.

Whereas, in the first embodiment, the stops 31 which are present there and against which the springs 38 on the one hand and the rolling bodies 24 on the other hand butt are designed as pins belonging to the clamping disc 21, in the second embodiment these stops 131 projecting transversely into the track of the rolling bodies 124 are formed, for each rolling body 124, on the insert part 156. Each stop 131 assigned to a rolling body 124, starting from the flat plane annular portion 157, is bent approximately at right angles from this and projects upwards from this plane into the track of the rolling bodies 124. At the same time, each stop 131 is formed from a sheet-metal cutout of the sheet-metal formed part which is bent to form a box having the cross-sectional form of an approximate square or, for example, of a tube. In the embodiment shown, this stop 131 has an approximate square form. In another embodiment (not shown), it has the cross-sectional form of, for example, a triangle, another polygon, a circle or the like. This sheet-metal cutout is designated by 163 in FIGS. 6-9. The shape and/or size of each bent sheet-metal cutout 163 are selected at least large enough to ensure that an associated rolling body 124 can be supported on it from one side and the associated end of the spring 138 supported on it from the opposite side.

The positioning members 55 designed as pins in the first embodiment are also present in the second embodiment and there are likewise formed as elements of the insert part 156, especially sheet-metal formed part. The positioning members are designated there by 155. They consist of stop parts 164 which project upwards beyond the oblique supporting surface 160 and against which the supporting bodies 150 butt in their position in the circumferential direction. The stop parts 164 are designed as tongues which are cut out from the sheet-metal formed part and separated from the upwardly bent segments 159 carrying the oblique supporting surface 160 and which are bent upwards beyond the oblique supporting surface 160. At the same time, the stop parts 164 are located in the region of existing circumferential gaps which are formed between two segments 159 succeeding one another at a distance in the circumferential direction.

It can be advantageous to provide a one-piece upwardly bent stop part 164 for each circumferential gap between two respective segments 159. In contrast, in the embodiment shown, two stop parts 164, especially tongues, at a distance from one another in the circumferential direction, are arranged within a circumferential gap. At the same time, one stop part 164 is assigned as a positioning member to the confronting end of one supporting body 150 and the other stop part 164 to the confronting end of the next following supporting body 150. Formed in the gap region between two respective stop parts 164 is a toe-shaped sheet-metal cutout 165 which projects upwards in the interspatial region between two supporting bodies 150. This upwardly projecting sheet-metal cutout 165 is arranged approximately at the same circumferential location as a respective retention part 161. The latter is arranged on the ring outside of the insert part 156 and the upwardly projecting sheet-metal cutout 165 on the ring inside.

Details of the approximately toe-shaped upwardly bent sheet-metal cutout 165 can be seen especially from FIG. 10. The sheet-metal cutout 165 has an oblique tongue portion 166 which is bent upwards beyond the level of the oblique supporting surface 160 and which is directed radially inwards. There adjoins this tongue portion 166 an end portion 167 bent round relative to this and directed radially outwards. The two, in cross-section, form approximately a horizontal V, the aperture of which points radially outwards. This approximately toe-shaped upwardly projecting sheet-metal cutout 165 constitutes a retention device for the spring 138 during the assembly of the clamping device. During assembly, the spring 138 is of course mounted with some prestress between the driver 134, on the one hand, and the stop 131 in the form of the bent sheet-metal cutout 163, on the other hand. Thus, depending on the prestress, the spring 138 tends to arch upwards and spring away. This is counteracted by the sheet-metal cutout 165 which engages at least slightly over the spring 138.

The respective retention part 161, especially the nose, and each stop 131, formed by the bent sheet-metal cutout 163 of approximately box-shaped cross-section, is arranged on the ring outside of the insert part 156 in the form of the sheet-metal formed part. In contrast, the stop parts 164 and the upwardly projecting approximately toe-shaped sheet-metal cutout 165 are arranged respectively on the ring inside.

Each segment 159 carrying the oblique supporting surface 160 and in the form of the corresponding upwardly bent sheet-metal portion and/or each bent sheet-metal cutout 163 forming a stop 131 and/or each retention part 161 and/or each stop part 164 forming a positioning member and/or each upwardly projecting approximately toe-shaped sheet-metal cutout 165 could be deep-drawn from the sheet-metal formed part, thereby increasing the strength of the insert part 156 and of the individual elements.

Because all the elements described are part of the insert part 156 which is in the approximate form of a cage, a simplification and cost reduction are achieved. The clamping disc 121 and the clamping nut 117 can thus be produced especially cost-effectively and simply. The part which, in the first embodiment, carries the stops 31 and/or positioning members 55 can therefore be manufactured substantially more simply and more cost-effectively, for example as a simple lathe-turned part. This thus refers to the clamping nut 117 and the clamping disc 121. Because at least that part of the insert part carrying the supporting surfaces 160 for the supporting bodies 150 is hardened, a further simplification and cost reduction are obtained.

A further design likewise essential to the invention is also illustrated in the second embodiment. According to this, the insert part 156 in the form of the sheet-metal formed part is designed as a spring element exerting an axial spring force which is effective between the clamping nut 117 and the clamping disc 121 and which presses these apart from one another. For this, the insert part 156, especially sheet-metal formed part, is equipped with bent spring toes which rest preferably with prestress axially against the clamping disc 121 and/or clamping nut 117.

In an especially advantageous way, these spring tongues are formed, for example, by the upwardly projecting stop parts 164 designed as positioning members 155 and/or by the upwardly projecting approximately toe-shaped sheet-metal cutouts 165, especially their tongue portion 166 and adjoining end portion 167. Thus, these parts at the same time perform as a second function that of the axial spring element. At the same time, the parts 164, 165 forming the spring tongues can be bent and bent upwards so far that, in the illustrated arrangement of the insert part 156, they press resiliently against the clamping disc 121. This is represented diagrammatically by broken lines in FIG. 6 on the left for the tongue portion 166, the end portion 167 of which is bent upwards so that it rests with its end at the top in FIG. 6 against the clamping disc 121. The said spring tongues can be adjusted so as to obtain the necessary spring force, preferably approximately of the order of 150 to 300N, by means of which the clamping nut 117 and the clamping disc 121 are resiliently held axially apart from one another. To obtain the necessary spring travel, for example of the order of approx. 0.5 mm, the clamping device is designed so that the corresponding travel is added during the clamping of the clamping device. Because the insert part 156, especially sheet-metal formed part, is designed at the same time as the spring, safety against the automatic release of the clamping device is improved considerably by simple means. Any danger that, for example, the clamping nut 117 will possibly come loose under pronounced vibrations in some circumstances is reliably counteracted.

Otherwise, the handling and operating mode of the clamping device according to the embodiment illustrated in FIGS. 6–10 is similar to those according to FIGS. 1–5.

While the invention has been illustrated and described as embodied in a clamping device for clamping a tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A device for axially clamping a disc-shaped tool on a flange of a driven spindle with a threaded end, said clamping device comprising a clamping nut; a clamping disc supported on said clamping nut for biasing the tool against the flange and connected with said clamping nut for joint rotation therewith and axial displacement relative thereto; supporting bodies arranged between said clamping nut and said clamping disc and each having a guide track; an actuating member located between said clamping nut and said clamping disc and defining guide track means and radial recesses opening into said guide track means; rolling bodies displaceable along guide paths defined by guide tracks of said supporting bodies and said guide track means for radially loading said supporting bodies; and an insert member supported between said clamping nut and said clamping disc and including a plurality of stops projecting into said guide paths, said actuating member pressing said rolling bodies against said stops upon rotation in a first direction corresponding to a clamping direction, and displacing said rolling bodies into associated radial recesses upon rotation in a second direction opposite to said first direction whereby said supporting bodies are relieved from radial loads; and means on said supporting bodies for applying clamping pressure to said clamping disc.

2. A clamping device as set forth in claim 1, wherein said insert member comprises a sheet-metal formed part.

3. A clamping device as set forth in claim 2, wherein said sheet-metal formed part is a sheet-metal stamped part.

4. A clamping device as set forth in claim 2, wherein said insert member comprises, at least partially flat ring, one of said clamping nut and said clamping disc having a plane radial surface with a flat and plane annular portion for supporting said at least partially flat ring.

5. A clamping device as set forth in claim 4, wherein said insert member includes projecting retention parts directed toward said one of said clamping nut and clamping disc, said one of said clamping nut and clamping disc having receptacles in which said projecting retention parts engage whereby said insert member is positively coupled with said one of said coupling nut and said clamping disc in a circumferential direction.

6. A clamping device as set forth in claim 5, wherein said projecting retention parts are noses, and said receptacles are bores.

7. A clamping device as set forth in claim 5, wherein said projecting retention parts are arranged at equal circumferential angular distances from each other.

8. A clamping device as set forth in claim 5, wherein said insert member has a flat and plane annular portion, said projection retention parts being tabs bent approximately at right angles out of a plane of said flat and plane annular portion.

9. A clamping device as set forth in claim 2, wherein said insert member has supporting surfaces extending frustoconically at one of said clamping nut and said clamping disc, said supporting bodies having bearing surfaces resting against said supporting surfaces.

10. A clamping device as set forth in claim 9, wherein said insert member includes a plurality of segments having top sides defining said supporting surfaces, each of said supporting surfaces having an angular circumferential extent corresponding approximately to a circumferential extent of an associated supporting body.

11. A clamping device as set forth in claim 10, wherein said segments are ring segments.

12. A clamping device as set forth in claim 2, wherein said insert member has a flat and plane annular portion, and ring segments comprising sheet-metal portions bent out of a plane of said flat and plane annular portion.

13. A clamping device as set forth in claim 12, wherein one of said clamping nut and said clamping disc has surface means for axially supporting said sheet-metal portions, said sheet-metal portions being bent at least approximately at an angle at which said axially supporting surface means extends.

14. A clamping device as set forth in claim 13, wherein said axially supporting surface means extends at an angle of approximately 15°.

15. A clamping device as set forth in claim 10, wherein said segments extend each over a circumferential angle of approximately 50-60°.

16. A clamping device as set forth in claim 10, wherein said segments are arranged substantially at equal circumferential angular distances from each other.

17. A clamping device as set forth in claim 10, wherein said insert member in an area of said supporting surfaces is hardened.

18. A clamping device as set forth in claim 1, wherein said insert member has a flat and plane annular portion, said stops extending from said annular plane at approximately right angle.

19. A clamping device as set forth in claim 18, wherein each of said stops is formed by a sheet-metal cutout bent to form one of box, tube and the like having a cross-section of one of triangle, square, polygon, circle and the like.

20. A clamping device as set forth in claim 19, further comprising a plurality of springs for biasing said stops into engagement with said supporting bodies, at least one of shape and size of said bent-out portions being so selected that it insures support of said rolling bodies and said springs at opposite circumferential ends thereof.

21. A clamping device as set forth in claim 1, wherein said insert member includes a plurality of ring segments having top sides defining surfaces for supporting said supporting bodies and spaced a predetermined distance in a circumferential direction thereof, and at least one stop part located in a space between adjacent ring segments and projecting beyond an associated supporting surface for positioning an associated supporting body in a predetermined circumferential position thereof.

22. A clamping device as set forth in claim 21, wherein said stop part is formed as a tongue cutout from said sheet-metal formed part and separated from said ring segments formed as bent-out sheet-metal portions.

23. A clamping device as set forth in claim 22, further comprising two stop parts formed as cutout tongues circumferentially spaced from one another and located in the space between said two adjacent ring segments for positioning circumferentially spaced adjacent supporting bodies in predetermined circumferential positions thereof.

24. A clamping device as set forth in claim 23, wherein said sheet-metal formed part has a toe-shaped cutout in a space between said two tongues, said toe-shaped cutout projecting upward between said adjacent supporting bodies.

25. A clamping device as set forth in claim 24, wherein said insert member has a plurality of projecting retention parts, said toe-shaped sheet-metal cutout being arranged at approximately same circumferential location of said insert member as an associated projecting retention part.

26. A clamping device as set forth in claim 25, wherein said toe-shaped sheet-metal cutout is arranged on a ring inside said sheet-metal formed part.

27. A clamping device as set forth in claim 26, wherein said associated projecting retention part is arranged on said ring outside said sheet-metal formed part.

28. A clamping device as set forth in claim 24, wherein said toe-shaped sheet-metal cutout has an oblique tongue portion bent upwards beyond a level of an associated supporting surface which is also formed oblique and is directed radially inwardly.

29. A clamping device as set forth in claim 28, wherein said insert member has an end portion bent around said oblique tongue portion and extending radially outwards.

30. A clamping device as set forth in claim 29, wherein said oblique tongue portion and said end portion form an approximately horizontal V an aperture of which points radially outward.

31. A clamping device as set forth in claim 24, further comprising a plurality of springs for biasing said stops against said rolling bodies, said tongue portion and said end portion forming retention means for an associated spring, at least during assembly of the clamping device.

32. A clamping device as set forth in claim 12, wherein said bent sheet-metal portions are deep-drawn sheet-metal portions drawn from said sheet-metal formed part.

33. A clamping device as set forth in claim 19, wherein said sheet-metal cutout is a deep-drawn sheet-metal cut-out drawn from said sheet-metal formed part.

34. A clamping device as set forth in claim 22, wherein said cutout tongue is a deep-drawn sheet-metal tongue cutout drawn from said sheet-metal formed part.

35. A clamping device as set forth in claim 23, wherein said toe-shaped cutout is a deep-drawn toe-shaped sheet-metal cutout drawn from said sheet-metal formed part.

36. A clamping device as set forth in claim 2, wherein said sheet-metal formed part comprises a spring part that biases said clamping nut and said clamping disc away from each other.

37. A clamping device as set forth in claim 36, wherein said spring part includes bent spring tongues resting against said clamping nut and said clamping disc.

38. A clamping device as set forth in claim 37, wherein said spring tongues are prestressed.

39. A clamping device as set forth in claim 37, wherein said sheet-metal formed part has at least one of upwardly projecting tongues and toe-shaped sheet-metal cutouts defining said spring tongues.

40. A clamping device as set forth in claim 39, wherein said toe-shaped sheet-metal cutouts comprise tongue portions and associated end portions defining together said spring tongues.

41. A clamping device as set forth in claim 1, wherein said actuating member includes a plurality of drivers projecting radially inward.

42. A clamping device as set forth in claim 41, wherein said actuating member is a sintered part.

43. A clamping device as set forth in claim 1, wherein said rolling bodies are cylindrical rolling bodies and said guide paths are cylindrical tracks.

44. A clamping device as set forth in claim 1, wherein said actuating member comprises a ring having approximately cylindrical annular first and second collars that at least partially surround and engage outer surfaces of said clamping disc and said clamping nut, respectively.

45. A clamping device as set forth in claim 44, comprising two sealing rings arranged respectively between a respective one of said first and second collars and said clamping disc and said clamping nut.

* * * * *